US012630391B2

(12) United States Patent (10) Patent No.: US 12,630,391 B2
Chen et al. (45) Date of Patent: May 19, 2026

(54) ELEVATOR POSITIONING SYSTEM WITH CASCADING REFLECTOR ARRANGEMENT

(71) Applicant: HONEYWELL INTERNATIONAL INC., Charlotte, NC (US)

(72) Inventors: En Yi Chen, Charlotte, NC (US); Yang Lu, Charlotte, NC (US); Wu Chen, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 888 days.

(21) Appl. No.: 18/046,570

(22) Filed: Oct. 14, 2022

(65) Prior Publication Data

US 2023/0133336 A1 May 4, 2023

(30) Foreign Application Priority Data

Oct. 29, 2021 (CN) .......................... 202111272980.7

(51) Int. Cl.
*B66B 3/02* (2006.01)
*B66B 5/00* (2006.01)
*G01S 13/06* (2006.01)

(52) U.S. Cl.
CPC .............. *B66B 3/02* (2013.01); *B66B 5/0018* (2013.01); *G01S 13/06* (2013.01)

(58) Field of Classification Search
CPC .......... B66B 3/02; B66B 5/0018; G01S 13/06
USPC ........................................................ 187/399
See application file for complete search history.

(56) References Cited

U.S. PATENT DOCUMENTS 5,682,024 A * 10/1997 Koopman, Jr. ........... B66B 1/50
187/394
5,783,784 A * 7/1998 Durand ................... B66B 1/405
187/394

FOREIGN PATENT DOCUMENTS

CN 110143499 A 8/2019
CN 110203789 A * 9/2019 .......... B66B 5/0018
CN 111824878 A * 10/2020 .......... B66B 1/3492
CN 111847155 A 10/2020
(Continued)

OTHER PUBLICATIONS

EP Office Action Mailed on Jul. 22, 2024 for EP Application No. 22199489, 5 page(s).
(Continued)

*Primary Examiner* — Kawing Chan
(74) *Attorney, Agent, or Firm* — ALSTON & BIRD LLP

(57) ABSTRACT

Various embodiments are directed to determining an elevator car position within an elevator shaft using radar-based distance measurements and a plurality of radar reflectors positioned along the elevator shaft. In one aspect, an example method is provided. The method includes associating a height segment of the elevator shaft with each of the plurality of radar reflectors. The method further includes selecting a target reflector from the plurality of radar reflectors based at least in part on an initial height of the elevator car being within a height segment associated with the target reflector. The method further includes determining an inferred position of the elevator car within the elevator shaft based at least in part on determining a radar-based distance measurement to the target reflector. The radar reflectors may be positioned such that at least one radar reflector is optimally detectable by a dynamically-positioned radar transceiver of the elevator car.

10 Claims, 5 Drawing Sheets

(56) References Cited

FOREIGN PATENT DOCUMENTS

| JP | 10-157940 | A | 6/1998 |
| JP | 5932577 | B2 | 6/2016 |
| WO | 2014/082258 | A1 | 6/2014 |

OTHER PUBLICATIONS

Communication about intention to grant a European patent Mailed on May 2, 2025 for EP Application No. 22199489, 6 page(s).
European search report Mailed on Feb. 27, 2023 for EP Application No. 22199489.
Decision to grant a European patent Mailed on Aug. 28, 2025 for EP Application No. 22199489, 2 page(s).

* cited by examiner

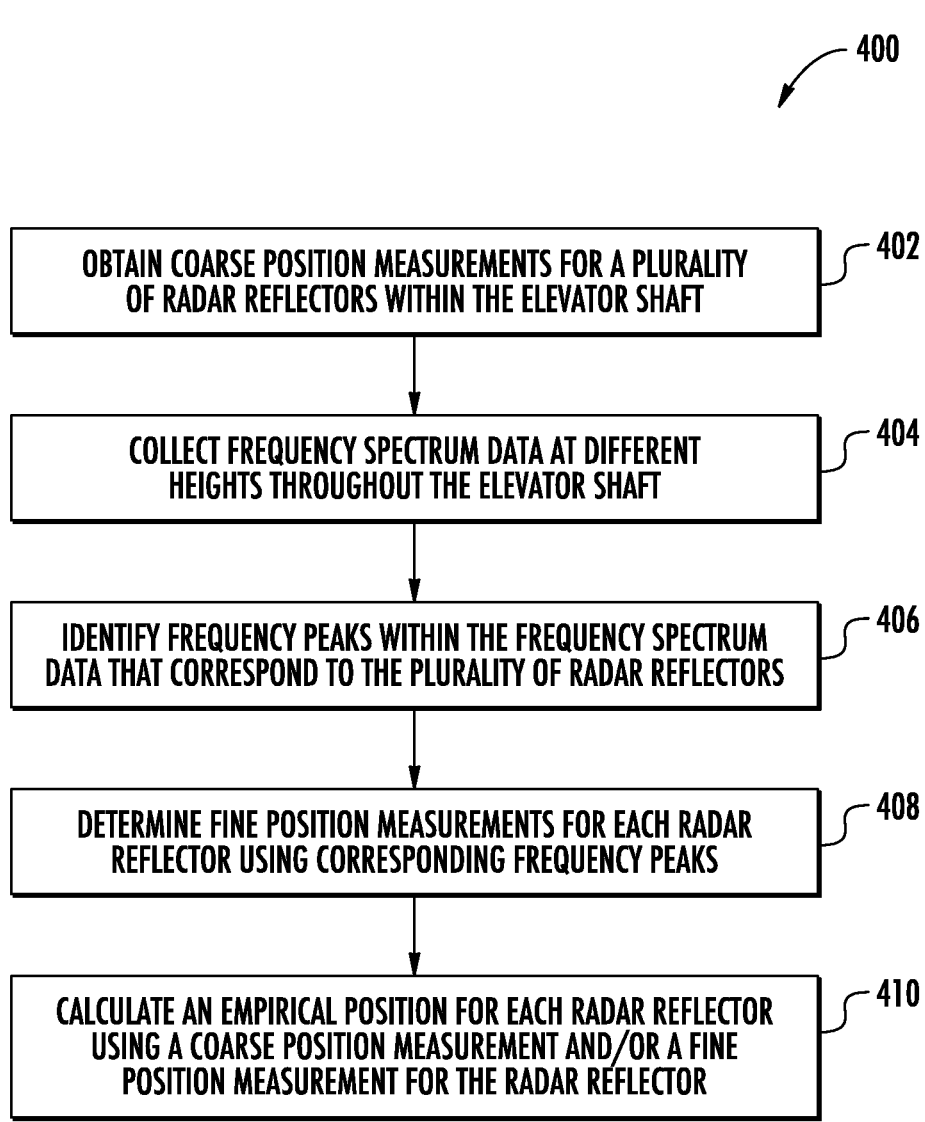

400

OBTAIN COARSE POSITION MEASUREMENTS FOR A PLURALITY OF RADAR REFLECTORS WITHIN THE ELEVATOR SHAFT — 402

COLLECT FREQUENCY SPECTRUM DATA AT DIFFERENT HEIGHTS THROUGHOUT THE ELEVATOR SHAFT — 404

IDENTIFY FREQUENCY PEAKS WITHIN THE FREQUENCY SPECTRUM DATA THAT CORRESPOND TO THE PLURALITY OF RADAR REFLECTORS — 406

DETERMINE FINE POSITION MEASUREMENTS FOR EACH RADAR REFLECTOR USING CORRESPONDING FREQUENCY PEAKS — 408

CALCULATE AN EMPIRICAL POSITION FOR EACH RADAR REFLECTOR USING A COARSE POSITION MEASUREMENT AND/OR A FINE POSITION MEASUREMENT FOR THE RADAR REFLECTOR — 410

FIG. 4

ELEVATOR POSITIONING SYSTEM WITH CASCADING REFLECTOR ARRANGEMENT

CROSS-REFERENCE TO RELATED APPLICATIONS

This application claims priority pursuant to 35 U.S.C. 119(a) to Chinese Application No. 202111272980.7, filed Oct. 29, 2021, which application is incorporated herein by reference in its entirety.

FIELD OF THE INVENTION

Various embodiments described herein relate generally to measurement systems used in conjunction with an elevator system, and, more particularly, to a radar-based distance measurement system used for detecting and measuring reflected radar signals from a plurality of radar reflectors within an elevator shaft.

BACKGROUND

Industrial and commercial applications may use elevator systems to facilitate the transport of people, cargo, and/or the throughout various levels of a multi-story building. In particular, an elevator positioning system may be used to monitor the relative position (e.g., the relative height) of an elevator car within an elevator shaft, such that the elevator car may move between one or more desired locations along the elevator shaft. Real-time positioning is vital for further control of the elevator car, including stop positing, unexpected car movement protection, overspeed detection, and brake permeance monitoring.

BRIEF SUMMARY

Various embodiments described herein relate to elevator positioning systems and methods for using the same. According to an aspect of the present disclosure, a method for determining a position of an elevator car within an elevator shaft is provided. The method includes associating a height segment of the elevator shaft with each of a plurality of radar reflectors positioned along the elevator shaft. The method further includes selecting a target reflector from the plurality of radar reflectors based at least in part on an initial height of the elevator car being within a height segment associated with the target reflector. The method further includes determining an inferred position of the elevator car within the elevator shaft based at least in part on a radar-based distance measurement to the target reflector.

In various embodiments, the plurality of radar reflectors are individually separated such that at least one of the plurality of radar reflectors is within a signal range of a dynamically-positioned radar transceiver of the elevator car or otherwise optimally detectable by the radar transceiver. In some examples, the plurality of radar reflectors are individually separated by an approximately uniform distance. In various embodiments, each of the plurality of radar reflectors is associated with an empirical height measurement. The inferred position of the elevator car is determined based at least in part on the radar-based distance measurement to the target reflector and an empirical height measurement associated with the target reflector. In various embodiments, the empirical height measurements for the plurality of radar reflectors are determined based at least in part on: obtaining frequency spectrum data at a plurality of positions within the elevator shaft; identifying frequency peaks that correspond to the plurality of radar reflectors across the frequency spectrum data for the plurality of positions; and calculating the empirical height measurement for a particular radar reflector based at least in part on frequency values of a frequency peak corresponding to the particular radar reflector across the frequency spectrum data at the plurality of positions.

In various embodiments, the radar-based distance measurement to the target reflector is determined based at least in part on identifying a frequency peak corresponding to the target reflector within frequency spectrum data. In various embodiments, at least one of the plurality of radar reflectors is a pyramidal frustum reflector configured to directly reflector radar signals originating from the dynamically-positioned radar transceiver back to the dynamically-positioned radar transceiver.

In various embodiments, at least one radar reflector of the plurality of radar reflectors is configured with a particular geometric shape or arrangement such that radar signals reflected by the at least one radar reflector have or include a unique signature. In various embodiments, the unique signature is caused based at least in part on the at least one radar reflector being one of (i) two or more reflecting objects positioned in a particular geometric arrangement, or (ii) a pyramidal frustum reflector configured with a base plane of a particular geometric shape.

According to another aspect of the present disclosure, an elevator positioning system for determining a position of an elevator car within an elevator shaft is provided. The elevator positioning system includes a plurality of radar reflectors positioned along the elevator shaft. The elevator positioning system further includes a radar transceiver configured to generate real-time frequency spectrum data. The elevator positioning system further includes a controller communicably connected to the radar transceiver. The controller is configured to associate a height segment of the elevator shaft with each of the plurality of radar reflectors. The controller is further configured to select a target reflector from the plurality of radar reflectors based at least in part on an initial height of the elevator car being within a height segment associated with the target reflector. The controller is further configured to determine an inferred position of the elevator car within the elevator shaft based at least in part on a determining a radar-based distance measurement to the target reflector.

In various embodiments, the radar transceiver is dynamically positioned within the elevator shaft, and the plurality of radar reflectors are individually separated such that at least one of the plurality of radar reflectors is within a signal range of the radar transceiver or otherwise optimally detectable by the radar transceiver. For example, the plurality of radar reflectors are individually separated by an approximately uniform distance, in some examples. In various embodiments, each of the plurality of radar reflectors is associated with an empirical height measurement. The inferred position of the elevator car is determined based at least in part on the radar-based distance measurement to the target reflector and empirical height measurements associated with the target reflector. In various embodiments, the empirical height measurements for the plurality of radar reflectors are determined based at least in part on: obtaining the real-time frequency spectrum data from the radar transceiver at a plurality of positions within the elevator shaft; identifying frequency peaks that correspond to the plurality of radar reflectors across the real-time frequency spectrum data for the plurality of positions; and calculating the empirical height measurement for a particular radar reflector based at least in part on frequency values of a frequency peak corresponding to the particular radar reflector across the real-time frequency spectrum data at the plurality of positions.

In various embodiments, the radar-based distance measurement to the target reflector is determined based at least in part on identifying a frequency peak corresponding to the target reflector within frequency spectrum data. In various embodiments, at least one of the plurality of radar reflectors is a pyramidal frustum reflector configured to directly reflector radar signals originating from the dynamically-positioned radar transceiver back to the dynamically-positioned radar transceiver.

In various embodiments, at least one radar reflector of the plurality of radar reflectors is configured with a particular geometric shape or arrangement such that radar signals reflected by the at least one radar reflector have or include a unique signature. In various embodiments, the unique signature is caused based at least in part on the at least one radar reflector being one of (i) two or more reflecting objects positioned in a particular geometric arrangement, or (ii) a pyramidal frustum reflector configured with a base plane of a particular geometric shape.

According to another aspect of the present disclosure, a computer program product including at least one non-transitory computer-readable storage medium having computer-executable program code portions stored therein is provided. The computer-executable program code portions include program code instructions configured to associate a height segment of an elevator shaft with each of a plurality of radar reflectors positioned along the elevator shaft. The computer-executable program code portions include program code instructions further configured to select a target reflector from the plurality of radar reflectors based at least in part on an initial height of an elevator car being within a height segment associated with the target reflector. The computer-executable program code portions include program code instructions further configured to determine an inferred position of the elevator car within the elevator shaft based at least in part on determining a radar-based distance measurement to the target reflector.

In various embodiments, the plurality of radar reflectors are individually separated such that at least one of the plurality of radar reflectors is within a signal range of a dynamically-positioned radar transceiver of the elevator car or otherwise optimally detectable by the radar transceiver. In some examples, the plurality of radar reflectors are individually separated by an approximately uniform distance. In various embodiments, each of the plurality of radar reflectors is associated with an empirical height measurement. The inferred position of the elevator car is determined based at least in part on the radar-based distance measurement to the target reflector and an empirical height measurement associated with the target reflector. In various embodiments, the empirical height measurements for the plurality of radar reflectors are determined based at least in part on: obtaining frequency spectrum data at a plurality of positions within the elevator shaft; identifying frequency peaks that correspond to the plurality of radar reflectors across the frequency spectrum data for the plurality of positions; and calculating the empirical height measurement for a particular radar reflector based at least in part on frequency values of a frequency peak corresponding to the particular radar reflector across the frequency spectrum data at the plurality of positions.

In various embodiments, the radar-based distance measurement to the target reflector is determined based at least in part on identifying a frequency peak corresponding to the target reflector within frequency spectrum data. In various embodiments, at least one of the plurality of radar reflectors is a pyramidal frustum reflector configured to directly reflector radar signals originating from the dynamically-positioned radar transceiver back to the dynamically-positioned radar transceiver.

In various embodiments, at least one radar reflector of the plurality of radar reflectors is configured with a particular geometric shape or arrangement such that radar signals reflected by the at least one radar reflector have or include a unique signature. In various embodiments, the unique signature is caused based at least in part on the at least one radar reflector being one of (i) two or more reflecting objects positioned in a particular geometric arrangement, or (ii) a pyramidal frustum reflector configured with a base plane of a particular geometric shape.

BRIEF DESCRIPTION OF THE DRAWINGS

Reference will now be made to the accompanying drawings, which are not necessarily drawn to scale, and wherein:

FIG. 4 illustrates a flowchart of exemplary operations performed for determining a position of an elevator car within an elevator shaft using a plurality of radar reflectors in accordance with various embodiments of the present disclosure.

DETAILED DESCRIPTION

Figure 1:
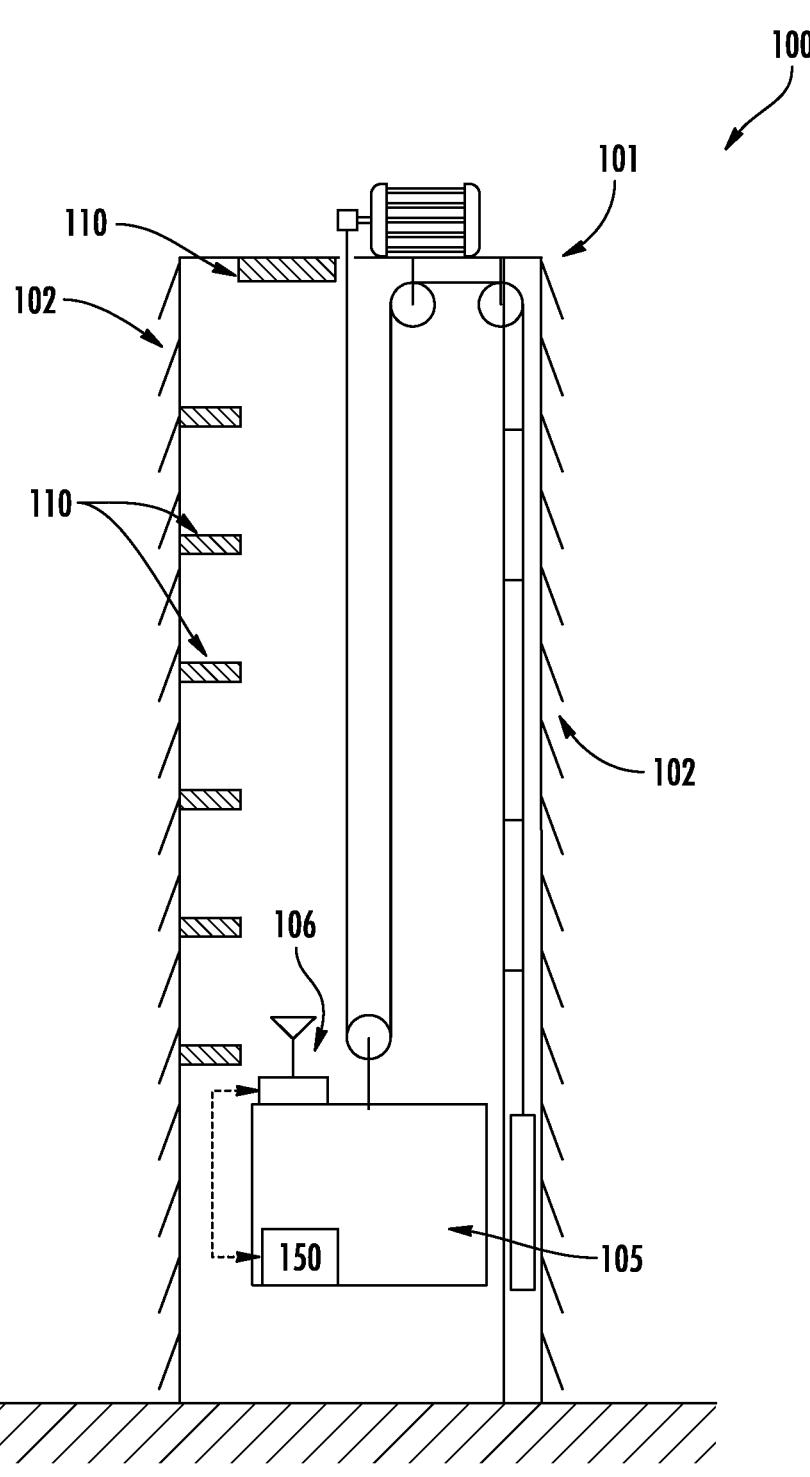
FIG. 1 schematically illustrates an exemplary elevator positioning system in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Elevator positioning systems may use radar-based distance measurements for accurate and precise determinations of a position of an elevator car within an elevator shaft. As understood by those of skill in the field to which the present disclosure pertains, radar-based distance measurements may rely on emitting radar signals, and detecting and measuring reflections of the radar signals from a radar reflecting surface (e.g., a metal plate or a metal slab). As elevator shafts may extend for long distances and elevations, signal strength of the reflections of the radar signals, or reflected radar signals, may substantially decrease and attenuate before being detected by a radar transceiver positioned far from the radar reflecting surface, or a radar reflector. As a result, the reflected radar signals are detected with signal strengths inadequate for accurate radar-based distance measurements. Many jurisdictions and entities have regulations that constrain radar output power and/or constrain gain of a radar antenna or other signal detecting component, and the limited space of an elevator shaft further constrains the size of the radar reflector and the radar transceiver. Various embodiments described in the present disclosure herein are directed to solving these technical challenges related to radar signal strength attenuation over long distances of an elevator shaft and are developed through applied ingenuity, effort, and innovation.

Various embodiments described herein relate to elevator positioning systems and methods for using the same that provide reliable detection of reflected radar signals at various positions of the radar transceiver and the elevator car. In particular, various embodiments described in the present disclosure minimize signal strength attenuation of reflected radar signals before being detected by a radar transceiver. Various embodiments are directed to an elevator positioning system that includes a plurality of radar reflectors positioned at different heights throughout an elevator shaft and a controller configured to determine a position of the elevator car within the elevator shaft using radar signals reflected by the plurality of radar reflectors.

In various embodiments, the plurality of radar reflectors are positioned within an elevator shaft within which an elevator car travels, and the plurality of radar reflectors are vertically arranged and are individually separated. That is, the plurality of radar reflectors may span from the top of the elevator shaft to the bottom of the elevator shaft. In some examples, the radar reflectors may be separated by an approximately uniform distance. For example, the approximately uniform distance may be based at least in part on a maximal working distance or signal range of a radar transceiver of the elevator car. In other non-limiting examples, the approximately uniform distance may be based at least in part on a constraint range of the elevator shaft (e.g., physical constraints and parameters for transmission and reflection of radar signals), a user-defined constant range, and/or the like. In further non-limiting examples, the radar reflectors may be installed at substantially random heights. Further still, in some non-limiting examples, the radar reflectors may be installed in accordance with various levels or floors along the elevator shaft. For example, a radar reflector may be positioned at each floor serviced by the elevator shaft/car, at every other floor serviced by the elevator shaft/car, every third floor, and/or the like.

Empirical or reference heights of each of the radar reflectors are precisely determined and stored in a database. In various embodiments, determination of the empirical or reference heights of the radar reflectors may be performed during calibration of the elevator positioning system, for example, prior to normal operation of the elevator car (e.g., transport of people, cargo to different levels). For determination of a position of the elevator car during operation of the elevator car, a controller of the elevator positioning system is configured to a target reflector from the plurality of radar reflectors based on an initial or previously determined position of the elevator car.

In various embodiments, the elevator positioning system is configured to determine a position of the elevator car (e.g., a relative height within the elevator shaft) based at least in part on measured distances between the elevator car and a selected target reflector and the empirical or reference heights of the target reflector. As such, intelligent selection of target reflectors from the plurality of radar reflectors enables, in some examples, accurate and reliable radar-based distance measurements to be used for elevator car positioning, instead of unreliable radar-based distance measurements from radar reflectors positioned too far away or from radar reflectors positioned too close.

Thus, various embodiments provide various technical effects and technical advantages in determining a position of an elevator car within an elevator shaft. Through the use of a plurality of radar reflectors fixedly positioned within an elevator shaft such that at least one radar reflector can be optimally detected at some position of a radar transceiver of the elevator car, elevator positioning systems in accordance with various embodiments of the present disclosure are configured to accurately and precisely determine a position (e.g., an elevation, a level) of an elevator car within an elevator shaft with an error of less than approximately 10 millimeters, thereby satisfying various industry standards and requirements (e.g., standard GB-7588).

In some example embodiments of the present disclosure, the position of an elevator car can be determined with an error of less than approximately 20 millimeters in either direction (e.g., above a true position, below a true position). In some example embodiments of the present disclosure, the position of an elevator car is determined with an error of less than approximately 10 millimeters in either direction. In some example embodiments of the present disclosure, the position of an elevator car is preferably determined with an error of less than approximately 8 millimeters in either direction. In some example embodiments of the present disclosure, the position of an elevator car is preferably determined with an error of less than approximately 5 millimeters in either direction.

As discussed, various embodiments involve selection of a target reflector from the plurality of radar reflectors for fine or high-resolution determination of elevator car position, and this selection of a target reflector is based at least in part on height segments or ranges of elevations or levels within the elevator shaft that are associated with each radar reflector. Thus, elevator positioning systems in accordance with various embodiments reliably and consistently select a target reflector for use in radar-based distance measurement. This association of a height segment with each radar reflector, in some examples, is more reliable and consistent for robust selection of a useful target reflector, and effects of noise and real-time determination delay on selection of a target reflector are precluded. In particular, selection of a target reflector according to signal strength of reflected radar signals originating from each reflector may be infeasible due to multipath interference, which may cause reflected radar signals originating from unreliable and non-useful (e.g., farther) reflectors to have higher signal strength than reflected radar signals originating from reflectors that should be designated as target reflectors. Thus, various embodiments provide a robust and noise-reduced method of selecting target reflectors for fine or high-resolution elevator car positioning.

FIG. 1 schematically illustrates an exemplary elevator positioning system 100 according to various embodiments described herein. The elevator positioning system 100 is configured for determining a position (e.g., a height) of an elevator car 105 within the elevator shaft 101. For example, an elevator positioning system 100 may be configured to determine the relative position (e.g., the relative height) of an elevator car within an elevator shaft as measured in a vertical direction (e.g., a direction extending parallel to a central axis of the elevator shaft along a height of the elevator shaft).

In various embodiments, the elevator positioning system 100 comprises a controller 150 configured to determine the position of the elevator car 105 based at least in part on radar-based distance measurements, specifically measurements of a distance between a radar transceiver 106 and radar reflectors 110. The controller 150 may be in electronic communication with (e.g., electronically coupled with) the radar transceiver 106 and may accordingly receive data from the radar transceiver 106 describing reflected radar signals. In some embodiments, the controller 150 may communicate wirelessly with the radar transceiver 106. While FIG. 1 illustrates the controller 150 being positioned with and/or within the elevator car 105 for electronic coupling and connection with the radar transceiver 106, the controller 150 may alternatively be positioned within the elevator shaft 101 or outside of an internal shaft portion of the elevator shaft 101 as enabled in part by wireless communication with the radar transceiver 106, in some example embodiments.

In various embodiments, the controller 150 is configured to determine the position of the elevator car 105 based at least in part on measurements of distances between a radar transceiver 106 and particularly selected radar reflectors 110 of a plurality of radar reflectors 110. Thus, in various embodiments, the radar transceiver 106 and radar reflectors 110 are arranged within the elevator shaft 101 such that the controller 150 may determine a position of the elevator car 105 within the elevator shaft 101 at a particular instance. In some example embodiments, the controller 150 may additionally be configured to operate the elevator car 105, such as causing movement of the elevator car between different positions, or otherwise providing other functionality related to movement of the elevator car (e.g., monitoring of elevator car speed).

Generally, the elevator shaft 101 may comprise an internal shaft portion configured to house an elevator car 105 such that a full range of motion of the elevator car 105 exists within the internal shaft portion of the elevator shaft. As illustrated, the internal shaft portion of the elevator shaft 101 may be defined within a plurality of outer walls of the elevator shaft 101, such as, for example, a top shaft surface, a bottom shaft surface, and one or more sidewalls 102 extending in a substantially vertical direction between the top shaft surface and the bottom shaft surface. In various embodiments, the elevator shaft 101 comprises one or more rail fixtures attached to one or more sidewalls 102, and the elevator car 105 is configured to travel in a guided movement along the rail fixtures. For example, the elevator car 105 comprises wheels configured to interface with the rail fixtures for smooth, continuous, and guided movement of the elevator car 105.

In various embodiments, a shaft height of the elevator shaft 101 may be defined by a distance between the top shaft surface and the bottom shaft surface, as measured in the vertical direction. For example, in various embodiments, one or more of the top shaft surface and the bottom shaft surface may be centered about the central axis of the elevator shaft 101 such that a perpendicular axis extending from a center of the respective surface may be coaxial with the central axis of the elevator shaft 101. Further, in various embodiments, one or more of the top shaft surface and the bottom shaft surface may comprise at least substantially planar surfaces extending along a horizontal plane. As a non-limiting example, each of the top shaft surface and the bottom shaft surface may extend along a respective horizontal plane such that the top shaft surface and the bottom shaft surface are parallel to one another. In such an exemplary configuration, the height of the elevator shaft may be defined by the distance along the central axis of the elevator shaft 101 between the top shaft surface and the bottom shaft surface. As previously discussed, the elevator positioning system 100 is configured to determine a relative height of the elevator car 105 within the elevator shaft 101. For example, the relative height of the elevator car 105 may reference and/or be a fraction of the height of the elevator shaft 101. In another non-limiting example, a relative height of the objects within the elevator shaft 101, such as the elevator car 105 and various radar reflectors 110, may be in reference to the bottom shaft surface of the elevator shaft 101.

In various embodiments, an elevator car 105 disposed within an elevator shaft 101 may be configured in a substantially level configuration wherein a top car surface and a bottom car surface each comprise an at least substantially planar surface extending along respective horizontal planes, each plane being perpendicular to the vertical direction, as described herein. For example, the top car surface and the bottom car surface may be parallel to one another. Further, in various embodiments, the top car surface and the bottom car surface may be parallel to one or more of the top shaft surface and the bottom shaft surface. In various embodiments, the elevator car 105 is substantially level based at least in part on configuration and control of the wheels of the elevator car interfacing with the rail fixtures.

As illustrated, in various embodiments, the elevator car 105 may be configured such that the top car surface is arranged in an upward-facing configuration so as to face toward the top shaft surface of the elevator shaft 101 positioned vertically above the elevator car 105. Further, in various embodiments, the elevator car 105 may be configured such that bottom car surface is arranged in a downward-facing configuration so as to face toward the bottom shaft surface of the elevator shaft 101 positioned vertically beneath the elevator car 105. In various embodiments, an elevator car 105 may be installed within an elevator shaft 101 in an at least partially suspended configuration such that one or more gravitational forces acting on the elevator car 105 may stabilize the bottom car surface in an at least substantially horizontal configuration perpendicular to the vertical direction.

In various embodiments, the elevator car 105 may have a range of motion within the internal shaft portion of the elevator shaft 101 that may be defined in an at least substantially vertical direction by the rail fixtures. With controlled motion of the elevator car 105 (e.g., for delivery of people, cargo, and/or the like between different levels of a building), the position or height of the elevator car 105 within the elevator shaft may be variable over time, and the elevator positioning system 100 is configured to determine a position of the elevator car 105 at different timepoints and to record a time-dependent or time-variable profile of elevator car position.

Generally, the position of the elevator car 105 may be in reference to the position of a particular portion of the elevator car 105 within the elevator shaft 101. For example, the position of the elevator car may specifically describe the relative position or level at which the bottom car surface of the elevator car 105 is at within the elevator shaft 101. As another non-limiting example, the position of the elevator car 105 may specifically describe the relative position or level at which the top car surface of the elevator car 105 is at within the elevator shaft 101. In various embodiments, radar-based distance measurements between the radar transceiver 106 and a target reflector, and a relative position of the radar transceiver 106 on the elevator car 105 are used to precisely determine the position of the elevator car 105 itself within the elevator shaft 101. For example, the radar transceiver 106 is mounted or installed on a top car surface of an elevator car 105 having a 10 meter height, and using a determined position of the radar transceiver 106, a 10 meter-spanning position for the elevator car 105 can be determined (e.g., below the determined position of the radar transceiver 106). That is, in some example embodiments, the position of the elevator car 105 is a range of relative heights or levels within the elevator shaft 101 according to the dimensions of the elevator car 105 (e.g., a height from the bottom car surface to the top car surface). In various embodiments, determination of a relative height of the elevator car 105 within the elevator shaft 101 may be followed by determination of a three-dimension position of particular portions or points (e.g., corners of the elevator car 105, the wheels of the elevator car 105) within the elevator shaft 101.

As described herein, in various embodiments, the elevator positioning system 100 may comprise a radar transceiver 106 configured to emit a signal (e.g., a RF wave, a radar wave, and/or the like) and receive a reflection comprising at least a portion of the emitted signal reflected back from one or more radar reflectors 110 of the elevator positioning system 100. That is, generally, the radar transceiver 106 is configured to transmit original radar signals (e.g., pre-reflection, non-reflected, outbound) and to receive reflected radar signals. As a non-limiting example, in various embodiments, the radar transceiver 106 may comprise a single chip, Frequency Modulation Continuous Wave (FMCW) element be configured to emit a signal comprising a 60 GHz radar wave. In further examples, the radar transceiver 106 is configured to emit signals comprising radar waves having frequencies between approximately 30 GHz and approximately 400 GHz. In some examples, the radar transceiver 106 is configured to emit signals comprising radar waves having frequencies between approximately 20 GHz and approximately 100 GHz. In some further examples, the radar transceiver 106 is configured to emit signals comprising radar waves having frequencies between approximately 5 MHz to approximately 100 GHz. As a non-limiting example, in various embodiments, the radar transceiver 106 may be configured to detect one or more signals present within an elevator shaft (e.g., radar signals reflecting by radar reflectors 110) using a dielectric lens antenna.

In various embodiments, a radar transceiver 106 may be configured to receive a reflection and subsequently transmit transceiver signal data indicative of the detected reflection to a controller 150, as described herein. Specifically, the radar transceiver 106 may be configured to detect (e.g., receive) a reflection and generate transceiver signal data corresponding at least in part to the received reflection. For example, in various embodiments, transceiver signal data may embody a reflection, data corresponding to a reflection, and/or the like, that is configured for conversion and/or transmission as an output electric signal. In various embodiments, the radar transceiver 106 is in communication and/or electronically connected to the controller 150 that may be configured to facilitate communication and functional control therebetween. For example, the radar transceiver 106 may be configured to transmit transceiver signal data to controller 150, which may be configured to receive and/or process the transceiver signal data so as to facilitate the car position detection operation of the elevator positioning system 100, as described in further detail herein. By way of further non-limiting example, in various embodiments, transceiver signal data from the radar transceiver 106 may be processed by the controller 150 in order to determine distances between the radar transceiver 106 and one or more radar reflectors 110 at a given instance, which may be at least partially indicative of the position (e.g., relative height) of the elevator car 105 within the elevator shaft 101. In various embodiments, the transceiver signal data comprises frequency spectrum data that includes various frequency peaks, and each frequency peak may correspond to a reflected radar signal (e.g., reflected from a radar reflector 110) with adequate signal strength.

In various embodiments, the radar transceiver 106 is associated with a maximal working distance or a signal range. As generally understood by those of skill in the field to which the present disclosure pertains, the maximal working distance or signal range of the radar transceiver 106 may generally refer to a distance from the radar transceiver 106 that a reflecting surface may be positioned such that radar signals emitted by the radar transceiver 106 and reflecting against the reflecting surface and may be detected and measured with sufficient signal strength at the radar transceiver 106. In some examples, an example radar transceiver 106 has a maximal working distance within an example elevator shaft of between approximately 100 meters and approximately 200 meters. In some further examples, an example radar transceiver 106 has a maximal working distance within an example elevator shaft of between approximately 150 meters and approximately 250 meters. In some preferred example embodiments, an example radar transceiver 106 has a maximal working distance within an example elevator shaft of between approximately 130 meters and approximately 170 meters. In one example embodiment, an example radar transceiver 106 has a maximal working distance within an example elevator shaft of approximately 150 meters. In various example instances, the radar transceiver 106 has a maximal working distance or a signal range based at least in part on characteristics of the emitted or original radar signals. For example, a radar transceiver 106 emitting radar signals with a higher frequency may have a higher signal range based at least in part on the radar signals having sufficient energy to travel to a reflecting surface (e.g., a radar reflector 110) and be reflected back to the radar transceiver 106. The signal range of the radar transceiver 106 may be further based at least in part on physical characteristics of the radar transceiver 106 itself, such as surface area of a signal emitting surface, antenna gain, length or diameter of an antenna, and/or the like. In various embodiments, the radar transceiver 106 may be rated or specified with a pre-determined maximal working distance or signal range. It may be understood then that the radar transceiver 106 may detect reflected radar signals reflected from at least reflecting surfaces, such as radar reflectors 110, positioned within the maximal working distance or signal range of the radar transceiver 106.

In some example embodiments, the maximal working distance or a signal range can be established or defined by a user (e.g., an elevator technician). A user may conservatively define a general range of use for the radar transceiver 106 independent or irrespective of signal strength of radar signals emitted by the radar transceiver 106 and/or physical properties of the radar transceiver 106. For example, a user may define a range of use of 200 meters for the radar transceiver 106 within which the user believes that objects (e.g., radar reflectors 110) can be reliably detected by the radar transceiver 106. In an example embodiment, the range of use for the radar transceiver 106 is defined as 125 meters. In an example embodiment, the range of use for the radar transceiver 106 can be defined as a value between approximately 125 meters and approximately 75 meters. In an example embodiment, the range of use for the radar transceiver 106 can be defined as a value between approximately 100 meters and approximately 50 meters. In this regard, the radar transceiver 106 can be configured or tuned to detect objects within the user-defined range of use, such as by configuring signal characteristics (e.g., frequency, energy, bandwidth) of emitted radar signals and/or by configuring detection of reflected radar signals (e.g., via configuring antenna gain), in some example embodiments.

Alternatively, the elevator shaft 101 within which the radar transceiver 106 is positioned and operates may be associated with a constraint range. For instance, the elevator shaft 101 is associated with a constraint range that may be based at least in part on air composition within the elevator shaft 101, average temperature within the elevator shaft 101, material of the sidewalls and rail fixtures within the elevator shaft 101, sea-level elevation of the elevator shaft, and/or the like. The constraint range may be understood generally as an effect of an elevator shaft environment on the transmission and reflection of radar signals emitted by the radar transceiver 106. Likewise, the radar transceiver 106 can be configured for operation (e.g., emitting and detecting radar signals) within the constraint range of the elevator shaft 101, in some example embodiments, as an alternative to a maximal working distance or signal range, for example.

In various embodiments, a radar transceiver 106 is attached to a surface such that the radar transceiver 106 is disposed within the internal shaft portion of the elevator shaft 101 and arranged in an at least substantially vertical configuration (e.g., facing a vertically upward direction, facing a vertically downward direction). In various embodiments, the radar transceiver 106 is oriented vertically to emit radar signals as a wavefront such that at least some radar signals may reflect against reflecting surfaces (e.g., radar reflectors 110) that are horizontally parallel with the radar transceiver 106.

As discussed, the elevator positioning system 100 includes a plurality of radar reflectors 110 positioned along the elevator shaft 101. As illustrated in FIG. 1, the plurality of radar reflectors 110 are each positioned at a different position or relative height along the elevator shaft 101, such as in a vertical sequence. In some embodiments, each radar reflector 110 is associated with a unique and/or sequential identifier. As a non-limiting example reference as used herein in the present disclosure, the radar reflector 110 nearest the top shaft surface may be considered to be the "first" radar reflector 110, while the radar reflector 110 nearest the bottom shaft surface may be considered to be the "last" radar reflector 110. However, it will be understood that this sequential order of radar reflectors 110 is non-limiting and used in a descriptive manner, and other sequential orders of radar reflectors 110 may be used to describe and/or understand various embodiments described herein. In some embodiments, at least one reflector 110 may be attached to the top shaft surface, as illustrated in FIG. 1. In various embodiments, the plurality of radar reflectors 110 are approximately parallel with a horizontal plane or axis of the radar transceiver 106.

In various embodiments, a radar reflector 110 is configured for radar signal reflection, and preferably reflects radar signals such that the reflected radar signals are detected by the radar transceiver 106 with optimal signal strength. In some example embodiments, for example, at least one of the plurality of radar reflectors 110 is a pyramidal or pyramidal frustum radar reflector with a perpendicular apex (e.g., a projected apex) configured to directly reflect radar signals back to the radar transceiver 106. In some example embodiments, a radar reflector 110 includes two or more reflecting objects, such as two or more pyramidal frustum radar reflectors, and the reflecting objects of the radar reflector 110 are arranged in a particular geometric arrangement such that radar signals reflected by the radar reflector 110 have a unique signature distinguishable from other objects within the elevator shaft and/or from other radar reflectors 110. Similarly, in some example embodiments, a radar reflector 110 and/or objects thereof are configured in a particular geometric shape such that radar signals reflected by the radar reflector 110 have a unique and distinguishable signature. For instance, a radar reflector 110 is and/or comprises a pyramidal frustum reflector having a particular number of side panels to form a base plane with a particular geometric shape.

In various embodiment, at least some of the plurality of radar reflectors 110 may be configured for and exhibit dynamic movement to a certain extent in order to better distinguish such radar reflectors 110 in transceiver signal data. In some example instances, such dynamic movement may cause radar signals reflected by such radar reflectors 110 to have a unique signature. In some example embodiments, one or more radar reflectors 110 may continuously and/or intermittently rotate with respect to one or more axes such that radar signals reflected specifically by the one or more radar reflectors 110 are distinguishable from other objects (e.g., other radar reflectors 110) within the elevator shaft. In some example embodiments, a radar reflectors 110 may comprise two or more independently mobile reflecting objects, which similarly cause reflected radar signals to be particularly distinguishable. In various example embodiments, at least some of the plurality of radar reflectors 110 may be fixedly or statically positioned.

In various embodiments, the radar transceiver 106 is attached to the elevator car 105 while the plurality of radar reflectors 110 are fixedly positioned along the vertical length of elevator shaft 101. As such, the relative position of the radar transceiver 106 is related to the relative position of the elevator car 105. Distances between the radar transceiver 106 and the plurality of radar reflectors 110 may then change as the elevator car 105 travels throughout the elevator shaft 101 to different positions. As described herein, the radar transceiver 106 may be a dynamically-positioned radar transceiver.

In the illustrated embodiment of FIG. 1, the radar transceiver 106 is attached to the top car surface of the elevator car 105 and oriented in an upwards-facing configuration, thereby oriented to detect reflected radar signals reflected from a downward-facing surface of at least some of the radar reflectors 110. In some embodiments, the radar transceiver 106 is attached to a bottom car surface of the elevator car 105 and oriented in a downwards-facing configuration, thereby oriented to detect reflected radar signals reflected from an upward-facing surface of at least some of the radar reflectors 110. In some example embodiments, the elevator positioning system 100 comprises at least two radar transceivers 106 attached to both the top car surface in an upwards-facing configuration and the bottom car surface in a downwards-facing configuration. In other non-limiting example embodiments, one or more radar transceivers 106 may be attached to a side car surface in a vertical orientation (e.g., upwards-facing, downwards-facing).

Figure 2:
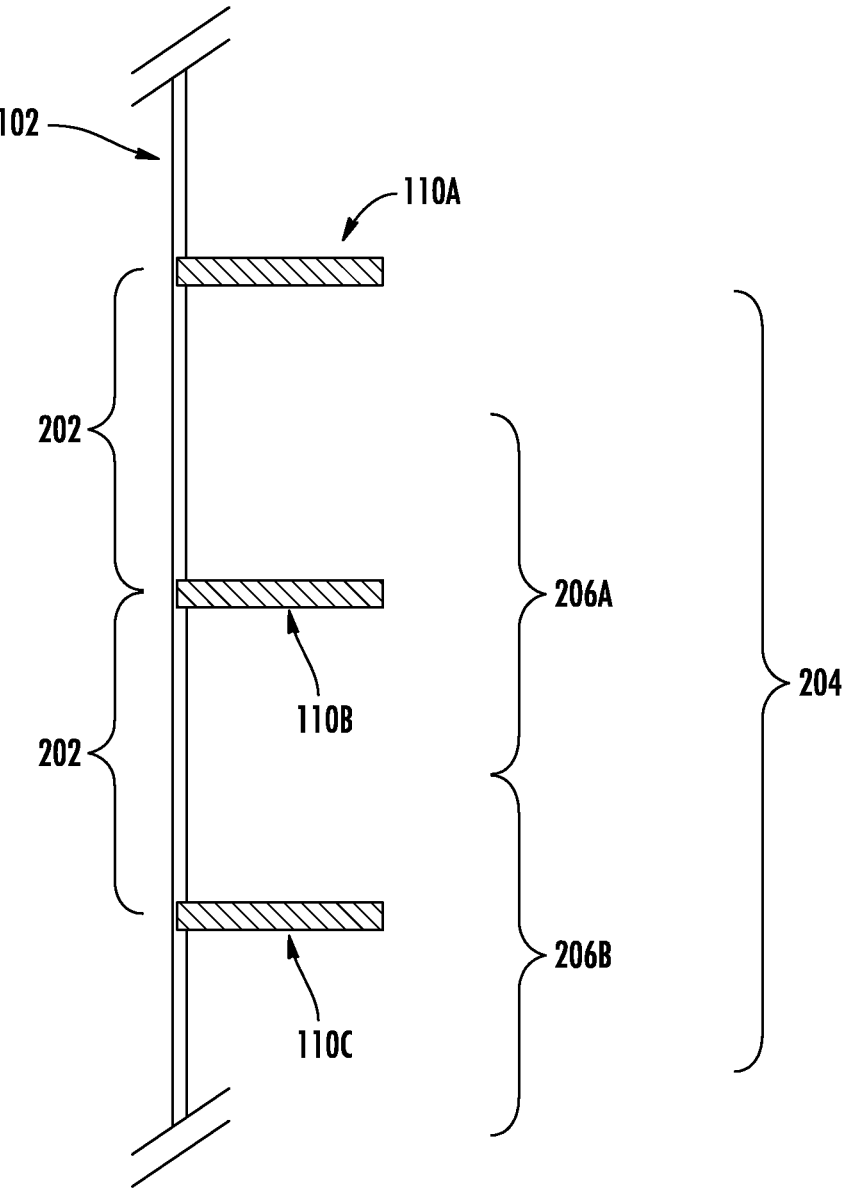
FIG. 2 provides a schematic view of a plurality of radar reflectors of an exemplary elevator positioning system in accordance with various embodiments.

FIG. 2 provides a more detailed view of the plurality of radar reflectors 110 fixedly positioned and attached to a sidewall 102 of the elevator shaft 101. FIG. 2 illustrates an exemplary portion of a sidewall 102 with a first radar reflector 110A, a second radar reflector 110B, and a third radar reflector 110C being positioned and attached to the exemplary portion of a sidewall 102. In various embodiments, an empirical or reference position may be measured and stored by the elevator positioning system 100, such as by the controller 150. In the illustrated embodiment, the radar reflectors 110A-C are approximately horizontal from the sidewall 102. That is, in various embodiments, the radar reflectors 110 are positioned with an angle of between approximately 5 degrees to approximately –5 degrees with respect to a horizontal axis. In some embodiments, the radar reflectors 110 are positioned with an angle of between approximately 2 degrees to approximately –2 degrees with respect to a horizontal axis. In some embodiments, the radar reflectors 110 are preferable positioned with an angle of between approximately 1 degrees to approximately –1 degrees with respect to a horizontal axis.

Due to horizontal orientation of the radar reflectors 110, detected signal strength of reflected radar signals reflected from a radar reflector relatively near the radar transceiver 106 emitting the original radar signals may be fairly low. That is, the incident angle of radar signals emitted by a radar transceiver 106 positioned near and horizontally adjacent to the radar reflector 110 is far from normal or perpendicular to the radar reflector 110, and thus, the reflector radar signals may be deflected away from the radar transceiver 106. Meanwhile, a radar transceiver 106 may not be able to detect reflected signals reflected by a radar reflector 110 positioned outside of a maximal working distance or a signal range of the radar transceiver 106. Thus, various embodiments are directed to selecting target reflectors from a plurality of radar reflectors 110 that are not positioned too close to radar transceiver 106 or too far from the radar transceiver 106, such that reliable and accurate distance measurements can be made using the target reflectors.

In various example embodiments, the plurality of radar reflectors 110 may be positioned and arranged such that at least one radar reflector 110 is positioned within a maximal working distance of a signal range of the radar transceiver 106. That is, one or more radar reflectors 110 are positioned within the signal range of the radar transceiver 106 at most or all possible positions of the radar transceiver 106 within the elevator shaft 101 (e.g., a dynamically-positioned radar transceiver 106). In various embodiments, the plurality of radar reflectors 110 may be approximately uniformly separated by a reflector spacing distance 202 (e.g., a uniform distance, a uniform separation distance), for example, and in some example embodiments, the reflector spacing distance 202 is based at least in part on a signal range 204 of the radar transceiver 106. In some examples, for a signal range 204 represented by the variable D, the reflector spacing distance 202 separating each of the plurality of radar reflectors 110 is between approximately 0.5D and approximately 0.75D. In some further examples, the reflector spacing distance 202 is between approximately 0.25D and approximately 0.75D. In further examples, the reflector spacing distance 202 is between approximately 0.1D and approximately 1D. As such, in some example instances, at least one radar reflector 110 may be positioned within the signal range 204 of the radar transceiver 106 at any position of the radar transceiver 106 within the elevator shaft 101.

As previously described, the radar reflectors 110 may be positioned in other manners alternative to the illustrated embodiment for FIG. 2. For example, the radar reflectors 110 may be randomly positioned at random heights, the radar reflectors 110 may be positioned according to various levels or floors along the elevator shaft 101, or the radar reflectors 110 may be separated by distances based at least in part on other values including an elevator shaft constraint range, a user-defined range of use, and/or the like. In such embodiments, determination of the empirical or reference heights of the radar reflectors 110 may be necessitated.

Figure 3:
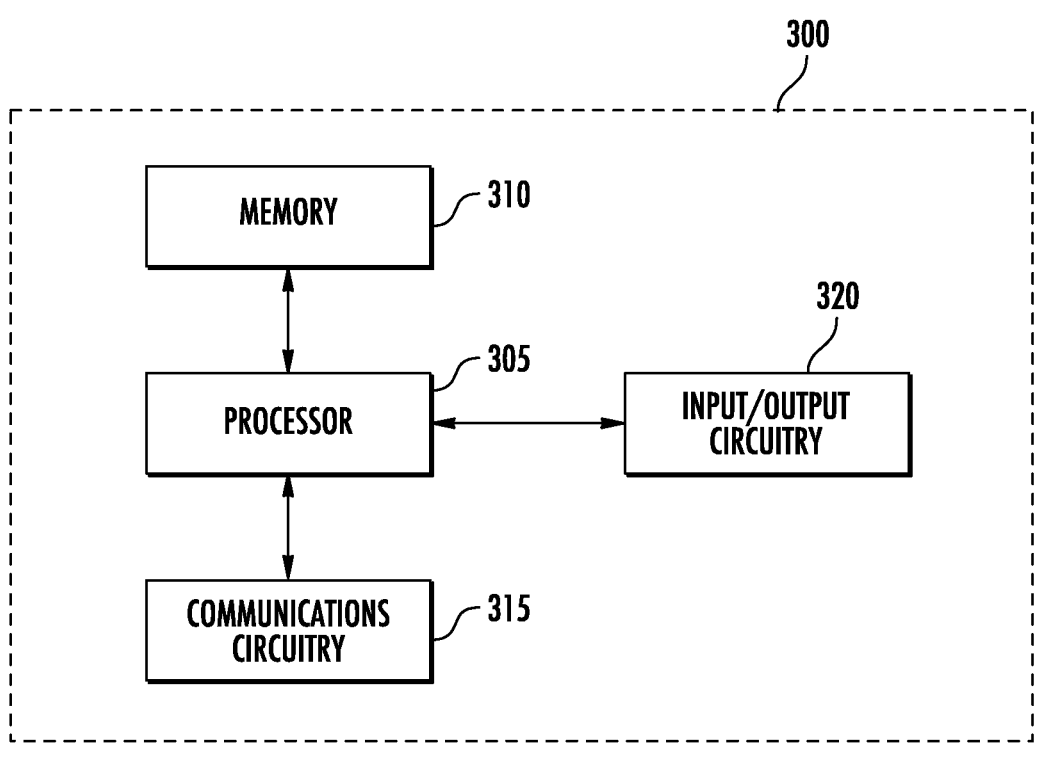
FIG. 3 schematically illustrates an exemplary apparatus for implementing various embodiments of the present disclosure.

Referring now to FIG. 3, an exemplary block diagram of an apparatus 300 configured for performing operations for determining a position of the elevator car 105 within the elevator shaft 101 using radar-based distance measurements is illustrated. In various embodiments, the apparatus 300 may embody (e.g., may be an embodiment of, may comprise, may be coupled to) the controller 150 of the elevator positioning system 100. As illustrated in FIG. 3, the apparatus 300 may comprise a processor 305, a memory 310, communication circuitry 315, and input/output circuitry 320. The apparatus 300 may be configured to execute (e.g., perform) one or more of the various operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 300 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 provide or supplement the functionality of particular circuitry. For example, the processor 305 may provide processing functionality, the memory 310 may provide storage functionality, the communications circuitry 315 may provide network interface functionality, and the like.

In some embodiments, the processor 305 (and/or co-processor or any other processing circuitry assisting or otherwise associated with the processor) may be in communication with the memory 310 via a bus for passing information among components of the apparatus. The memory 310 may be non-transitory and may include, for example, one or more volatile and/or non-volatile memories. For example, the memory 310 may be an electronic storage device (e.g., a computer readable storage medium). In various embodiments, the memory 310 may be configured to store information, data, content, applications, instructions, or the like, for enabling the apparatus to carry out various functions in accordance with example embodiments of the present disclosure. It will be understood that the memory 310 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 310 may be configured to store transceiver signal data (e.g., frequency spectrum data), elevator car position data, system historical data, and/or the like. In various embodiments, the memory 310 may be further configured to store empirical height measurements or empirical positions of each of the plurality of radar reflectors 110.

The processor 305 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 305 may be configured to execute instructions stored in the memory 310 or otherwise accessible to the processor 305. Alternatively, or additionally, the processor 305 may be configured to execute hard-coded functionality. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor to perform the algorithms and/or operations described herein when the instructions are executed.

The communications circuitry 315 may be a device or circuitry embodied in either hardware or a combination of hardware and software that is configured to receive and/or transmit data from/to a network and/or any other device, circuitry, or module in communication with the elevator positioning system 100. For example, the communications circuitry 315 may be configured to communicate with one or more computing devices via wired (e.g., USB) or wireless (e.g., Bluetooth, Wi-Fi, cellular, and/or the like) communication protocols. In an example embodiment, the apparatus 300 communicates with a database or external device storing data for determining elevator car position within the elevator shaft 101. For example, the apparatus 300 may retrieve empirical positions of radar reflectors 110 positioned within the elevator shaft 101 via the communications circuitry 315. In some embodiments, the apparatus 300 communicates with the radar transceiver 106 via communications circuitry 315. Additionally or alternatively, the apparatus 300 may communicate with the radar transceiver via input/output circuitry 320, such as to obtain frequency spectrum data.

In some embodiments, the apparatus 300 (e.g., embodying the controller 150) may include input/output circuitry 320 that may, in turn, be in communication with the processor 305 to provide output to the user and, in some embodiments, to receive input such as a command provided by the user. The input/output circuitry 320 may comprise a user interface, such as a graphical user interface (GUI), and may include a display that may include a web user interface, a GUI application, a mobile application, a client device, or any other suitable hardware or software. In some embodiments, the input/output circuitry 320 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 305, input/output circuitry 320 (which may utilize the processing circuitry), or both may be configured to control one or more functions of one or more user interface elements through computer-executable program code instructions (e.g., software, firmware) stored in a non-transitory computer-readable storage medium (e.g., memory 310). In some embodiments, the controller 150 does not interact directly with the user, the controller 150 may generate user interface data for display via input/output circuitry of one or more other devices with which one or more users directly interact and transmit the generated user interface data to one or more of those devices. For example, the controller 150, using user interface circuitry may generate user interface data for display by one or more display devices and transmit the generated user interface data to those display devices.

In various embodiments, the input/output circuitry 320 is configured for communicating with the radar transceiver 106 and may comprise circuitry such as transceiver signal processing circuitry. For example, input/output circuitry 320 includes circuitry such as transceiver signal processing circuitry that may be a device or circuitry embodied in either hardware or a combination of hardware and software that is configured to receive, process, generate, and/or transmit data, such as transceiver signal data generated by the transceiver. In various embodiments, the transceiver signal processing circuitry may be configured to receive and/or retrieve transceiver signal data from an exemplary transceiver. As described herein, in various embodiments, the transceiver signal data received by the input/output circuitry 320 may comprise, for example, one or more reflections from the one or more positioning elements, such as, for example, a plurality of reflections produced by each of a reflector element and one or more calibration reflector elements, and signal data corresponding to each of the one or more reflections. As described, the transceiver signal data received by the input/output circuitry 320 and originating from the radar transceiver 106 may be in the form of frequency spectrum data, in various embodiments. Generally, the transceiver signal processing circuitry comprised by the input/output circuitry 320 may be configured to execute one or more signal analysis processes to detect, within frequency spectrum data and/or various other signals, signal characteristics such as frequency peaks.

In various embodiments, the input/output circuitry 320 may be configured to execute one or more of the operations described herein at two or more instances, so as to facilitate the receiving, processing, generating, and/or transmitting of transceiver signal data (e.g., frequency spectrum data) at various instances (e.g., runtimes) over time. In various embodiments, the input/output circuitry 320 may be configured to store at least a portion of the resultant data (e.g., in memory 310, in a database) corresponding to one or more of the operations described herein as historical system data that, for example, may be associated with one or more instances (e.g., an installation instance, a particular runtime). In such an exemplary circumstance, the apparatus 300 may be configured to access at least a portion of the historical system data (e.g., via the memory 310) in order to facilitate the execution of one or more operations described herein.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Referring now to FIG. 4, a flowchart 400 describing various example operations for determining a position of the elevator car 105 within the elevator shaft 101 is illustrated. In particular, flowchart 400 describes various example operations for calculating empirical or reference positions (e.g., heights) of each of the plurality of radar reflectors 110 which are then used for real-time determination of elevator car position within the elevator shaft 101. For example, a position of the elevator car 105 within the elevator shaft 101 may be determined based at least in part on both radar-based distance measurements from the elevator car 105 to a target reflector and an empirical or reference position of the target reflector itself, in various example embodiments.

Generally, flowchart 400 for determining empirical positions or heights of the radar reflectors 110 is at least performed in example scenarios in which the radar reflectors 110 are separated by non-uniform distances, in example scenarios in which the radar reflectors 110 are randomly positioned, in example scenarios in which spacing of radar reflectors 110 is not necessarily dependent on a characteristic (e.g., a signal range) of the radar transceiver 106, and/or the like. However, it may be appreciated that in example embodiments in which the radar reflectors 110 are approximately uniformly separated by a distance based at least in part on a signal range of the radar transceiver 106, example operations of flowchart 400 may still be performed.

Accordingly, example operations of flowchart 400 may be performed during a calibration, training, installation, and/or the like time period prior to operation of the elevator car 105 (e.g., transportation of people, cargo, and/or the like between different levels) and determination of elevator car position. Thus, empirical or reference positions of each of the plurality of radar reflectors 110 may be determined and stored prior to determination of elevator car position within the elevator shaft 101. In various embodiments, at least some of the example operations described by the flowchart 400 are performed by the controller 150 (e.g., embodied by the apparatus 300), and the controller 150 comprises means (e.g., processor 305, memory 310, communications interface 315, input/output circuitry 320) for performing each example operation described by the flowchart 400.

As illustrated, flowchart 400 includes block 402, and in one embodiment, flowchart 400 begins or is initialized with block 402. At block 402, the controller 150 is configured to obtain coarse position measurements for the plurality of radar reflectors 110 positioned within the elevator shaft 101. That is, a coarse position measurement for each radar reflector 110 may be obtained. In various embodiments, a coarse position measurement for a particular radar reflector 110 may be a relative position of the particular radar reflector 110 within the elevator shaft 101 and/or may be a coarsely measured distance between the particular radar reflector 110 and an adjacent radar reflector 110. For example, the coarse position measurement may be an estimate of the reflector spacing distance 202. In some example instances, the particular radar reflector 110 may have a first coarse position measurement between the particular radar reflector 110 and a neighboring radar reflector 110 above the particular radar reflector 110 within the elevator shaft 101 and a second coarse position measurement between the particular radar reflector 110 and another neighboring radar reflector 110 below the particular radar reflector 110 within the elevator shaft 101. In some embodiments, a coarse position measurement describing the relative position or height of the particular radar reflector 110 within the elevator shaft 101 may be determined using the first and second coarse position measurements. A coarse position measurement may be determined using a non-radar-based measurement system or method (e.g., manual measurements by an elevator technician), in some example embodiments, and may be associated with an error range.

In various embodiments, the controller 150 comprises means, such as processor 305, memory 310, communication circuitry 315, input/output circuitry 320, and/or the like, for obtaining coarse position measurements for the plurality of radar reflectors 110. For example, in some example embodiments, coarse position measurements may be retrieved from a database accessible by the elevator positioning system 100, the coarse position measurements being determined and stored in the database previously, such as during installation of the plurality of radar reflectors 110. Similarly, the coarse position measurements may be retrieved from memory 310. In some example instances, the coarse position measurements may be stored in memory 310 based at least in part on user input via input/output circuitry 320. For example, a user may manually determine a coarse position measurement for each radar reflector 110 and provide the coarse position measurements as input to the controller 150.

At block 404, the controller 150 is configured to collect frequency spectrum data at different heights throughout the elevator shaft 101. In various embodiments, the controller 150 comprises means, such as processor 305, memory 310, input/output circuitry 320, and/or the like, for collecting frequency spectrum data. For example, the controller 150 may be configured to cause the radar transceiver 106 via input/output circuitry 320 to emit radar signals and to generate frequency spectrum data from detected reflections of the radar signals (e.g., reflected from at least the plurality of radar reflectors 110).

In particular, frequency spectrum data comprises frequency peaks each associated with a radar reflector 110, and at different heights, the frequency peak associated with a given radar reflector 110 may be at different frequencies due to the different distances between the radar transceiver 106 and the given radar reflector 110. The frequency spectrum data specifically may include frequency peaks associated with radar reflectors 110 within the maximal working distance or the signal range of the radar transceiver 106. In this regard, frequency spectrum data may be continuously or at least intermittently (e.g., periodically according to a configurable frequency) collected as an elevator car 105 continuously travels through different heights of the elevator shaft 101, such as during calibration operation of the elevator positioning system 100.

Continuous collection of frequency spectrum data as the elevator car 105 vertically traverses the elevator shaft 101 enables a frequency peak associated with a given radar reflector 110 to be tracked from its appearance in the frequency spectrum data (e.g., as the given radar reflector 110 comes into the signal range of the radar transceiver 106) to its disappearance from the frequency spectrum data (e.g., as the given radar reflector 110 goes out of the signal range of the radar transceiver 106). Additionally, frequency peaks can be easily associated with radar reflectors 110 as the frequency peaks sequentially appear in the frequency spectrum data as the elevator car 105 travels through the elevator shaft 101. For example, frequency spectrum data collected as the elevator car 105 is at an uppermost position within the elevator shaft 101 may include one frequency peak associated with a first radar reflector (e.g., attached to a top shaft surface of the elevator shaft 101), and another frequency peak may appear in the continuously collected frequency spectrum data as the elevator car 105 descends through the elevator shaft 101 past a second radar reflector.

Accordingly, at block 406, the controller 150 is configured to identify frequency peaks within each frequency spectrum data collected at a different height corresponding to the plurality of radar reflectors 110, and in various embodiments, the controller 150 comprises means, such as processor 305, memory 310, and/or the like, for identifying frequency peaks within the frequency spectrum data. Specifically, each frequency spectrum data collected at a different height includes one or more frequency peaks, and each frequency peak may be labelled with a reflector identifier, index, and/or the like based at least in part on the tracking of sequential appearances of the frequency peaks across frequency spectrum data of different heights. In various embodiments, the controller 150 (e.g., the processor 305 specifically) may be configured to use a classification machine learning model, a statistical model, thresholding, and/or the like to detect a frequency peak in the frequency spectrum data.

At block 408, the controller 150 is configured to determine fine position measurements for each radar reflector 110 using the frequency peaks corresponding to each radar reflector 110. In various embodiments, the controller 150 comprises means, such as processor 305, memory 310, and/or the like, for determining fine position measurements for each radar reflector 110 using the frequency peaks. Similar to the coarse position measurements, the fine position measurements for a particular radar reflector 110 may describe a relative position or height of the particular radar reflector 110 within the elevator shaft 101 and/or a distance between the particular radar reflector 110 and an adjacent radar reflector 110. It may be appreciated that the reflector spacing distance 202 in reality may not be perfectly uniform between each adjacent pair of radar reflectors 110 and may be further varied according to non-uniform thicknesses of each radar reflector 110. Accordingly, fine position measurements may supplement, refine, replace, and/or the like the coarse position measurements through the high accuracy and resolution of the frequency spectrum data. Specifically, determining fine position measurements for each radar reflector 110 comprises determining a distance between each adjacent pair of radar reflectors 110 using the frequency spectrum data, and in particular, the frequency peaks associated with each radar reflector 110 of an adjacent pair of radar reflectors 110.

At block 410, the controller 150 is configured to calculate an empirical position (e.g., a reference relative height within the elevator shaft 101) for each radar reflector 110 using the coarse position measurement and the fine position measurements for each radar reflector 110. In various embodiments, the controller 150 comprises means, such as processor 305, memory 310, and/or the like, for calculating an empirical position for each radar reflector 110. The empirical position for a radar reflector 110 may be based at least in part on at least one of the coarse position measurement or the fine position measurement for the radar reflector 110. In various embodiments, the empirical position for a radar reflector 110 is a relative position or height of the radar reflector 110 within the elevator shaft 101 and is therefore determined based at least in part on adding coarsely and/or finely determined distances between radar reflectors 110. For example, referring back to FIG. 1, an empirical position for the third radar reflector 110 sequentially from the top shaft surface of the elevator shaft 101 may be determined based at least in part on adding (i) a coarsely and/or finely determined distance between the radar reflector 110 attached to the top shaft surface of the elevator shaft 101 and the second radar reflector 110, and (ii) a coarsely and/or finely determined distance between the second radar reflector 110 and the third radar reflector 110. In various embodiments, the empirical positions of each radar reflector 110 is stored, such as in memory 310, in a database accessible by the elevator positioning system 100, and/or the like.

Figure 5:
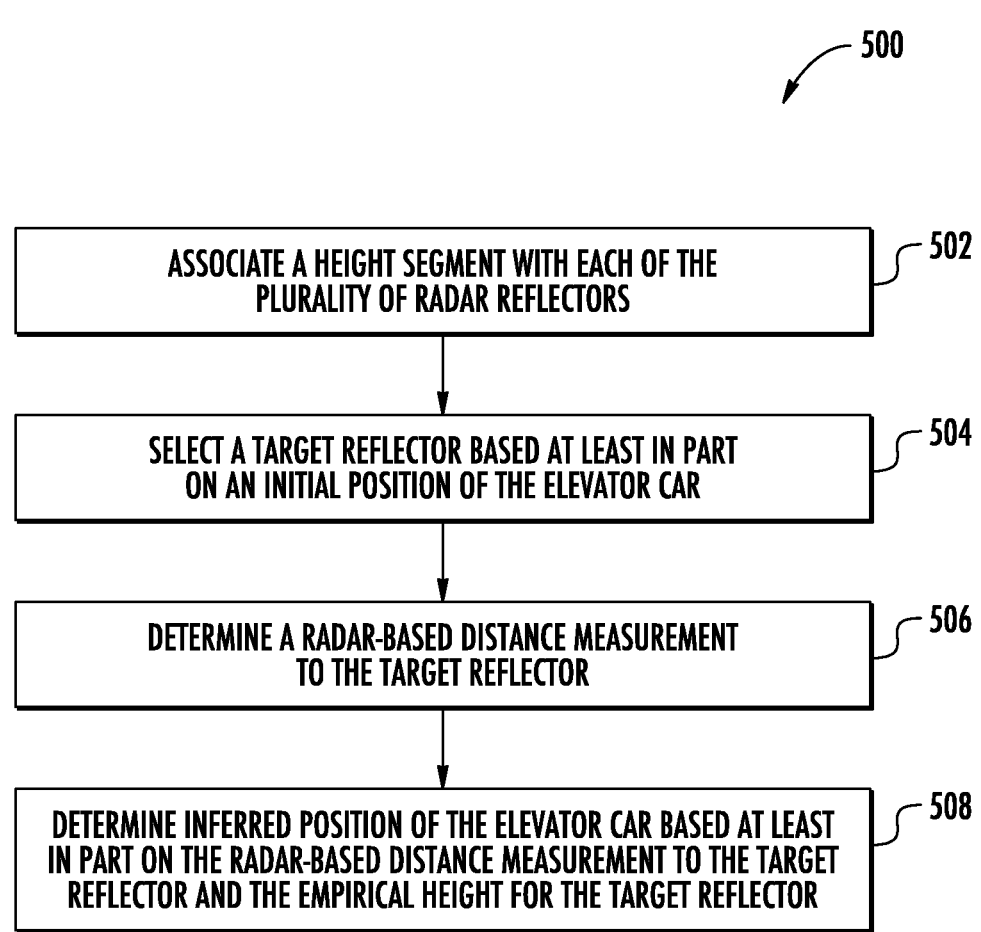
FIG. 5 illustrates a flowchart of exemplary operations performed for determining empirical or reference heights associated with a plurality of radar reflectors in accordance with various embodiments of the present disclosure.

FIG. 5 illustrates a flowchart 500 for determining a position of the elevator car 105 within the elevator shaft 101 using radar-based distance measurements with the plurality of radar reflectors 110. Specifically, flowchart 500 describes example operations performed to determine elevator car position within the elevator shaft 101, in accordance with various embodiments of the present disclosure. In various embodiments, the example operations of flowchart 500 are performed to determine the position of the elevator car 105 in real-time during elevator car operation (e.g., to transport people, cargo, and/or the like between different elevations or levels). It may be appreciated that flowchart 500 may be performed subsequent to calculation of empirical positions of the plurality of radar reflectors 110, such as by example operations of flowchart 400. In various embodiments, at least some of the example operations described by the flowchart 500 are performed by the controller 150 (e.g., embodied by the apparatus 300), and the controller 150 comprises means (e.g., processor 305, memory 310, communications interface 315, input/output circuitry 320) for performing each example operation described by flowchart 500.

As illustrated, flowchart 500 comprises block 502, at which the controller 150 is configured to associate a height segment of the elevator shaft 101 with each of the plurality of radar reflectors 110. Specifically, the height segment may be determined and associated with a radar reflector 110 based at least in part on the empirical or reference height associated with the radar reflector 110. In various embodiments, the controller 150 comprises means, such as processor 305, memory 310, and/or the like, for associating a height segment of the elevator shaft 101 with each of the plurality of radar reflectors 110. In various embodiments, a height segment is defined as a range of heights or positions within the elevator shaft, and height segments associated with the radar reflectors 110 are defined and stored in a database accessible by the elevator positioning system 100.

Referring back to FIG. 2, height segments 206 associated with radar reflectors 110 are illustrated. Specifically, FIG. 2 illustrates a first height segment 206A associated with the first radar reflector 110A and a second height segment 206B associated with the second radar reflector 110B. It will be appreciated that, as in the illustrated embodiment, a height segment associated with a given radar reflector 110 generally includes heights below the given radar reflector 110 in instances in which the radar transceiver 106 is oriented in an upwards-facing configuration such that radar signals emitted by the radar transceiver 106 may reflect against downward-facing surfaces of the radar reflectors 110. Similarly, in example embodiments in which the radar transceiver 106 is oriented in a downwards-facing configuration, a height segment associated with a given radar reflector 110 generally includes heights above the given radar reflector 110.

In various embodiments, a height segment for a given radar reflector 110 spans between points within two spacing distances 202 near (e.g., below, above) the given radar reflector 110, as illustrated in FIG. 2. For example, the first height segment 206A associated with the first radar reflector 110A spans from a midpoint between the first radar reflector 110A and the second radar reflector 110B to a midpoint between the second radar reflector 110B and the third radar reflector 110C. As a result, a radar transceiver 106 may be positioned within the first height segment 206A without being too close to the first radar reflector 110A and without being too far from the first radar reflector 110A. While example embodiment discuss height segments spanning between midpoints of height segments 206, it will be understood that other variations may be implemented. In an example scenario in which the first radar reflector 110A is positioned at 100 meters, the second radar reflector 110B at 50 meters, and the third radar reflector 110C at 0 meters, the first height segment 206A associated with the first radar reflector 110A may span from approximately 80 meters to approximately 30 meters, for example.

It should also be recognized that a top-most radar reflector 110 and a bottom-most radar reflector 110 may have unique height segments. In an example embodiment in which the radar transceiver 106 is oriented in an upwards-facing configuration and height segments include heights below associated radar reflectors 110, the top-most radar reflector 110 may include a relatively larger height segment, while the bottom-most radar reflector 110 may include a relatively smaller height segment. Likewise, in an example embodiment in which the radar transceiver 106 is oriented in a downwards-facing configuration and height segments include heights above associated radar reflectors 110, the top-most radar reflector 110 may include a relatively smaller height segment, while the bottom-most radar reflector 110 may include a relatively larger height segment.

Returning to FIG. 5, at block 504, the controller 150 is configured to select a target reflector from the plurality of radar reflectors 110 based at least in part on an initial position of the elevator car 105. In various embodiments, the controller 150 comprises means, such as processor 305, memory 310, and/or the like, for selecting target reflectors from the plurality of radar reflectors 110 based at least in part on an initial position of the elevator car 105. In various embodiments, the initial position of the elevator car 105 is a last-known or last-determined position. In particular, a target reflector is selected based at least in part on the initial position of the elevator car 105 being within a height segment associated with the target reflector. For example, the controller 150 is configured to reference the initial position of the elevator car 105 against defined ranges of the height segments (e.g., stored in memory 310, stored in a database).

In some embodiments, more than one target reflector may be selected. In example instances, two target reflectors may be selected in instances in which the initial position of the elevator car 105 is approximately near a border between height segments. In some example embodiments, height segments may overlap, causing the controller 150 to select at least two height segments when the initial position of the elevator car 105 is within overlapping portions of two height segments. In various embodiments, selecting a target reflector comprises selecting a reflector index or identifier associated with the target reflector.

At block 506, the controller 150 is configured to determine a radar-based distance measurement to the selected target reflector. In various embodiments, the controller 150 comprises means, such as processor 305, memory 310, input/output circuitry 320, and/or the like, for determining a radar-based distance measurement to the selected target reflector. For example, the controller 150 receives, retrieves, access, and/or the like transceiver signal data comprising frequency spectrum data from memory 310 and/or from the radar transceiver 106 via input/output circuitry 320.

In various embodiments, the radar-based distance measurement to the selected target reflector is determined based at least in part on analyzing and processing frequency spectrum data collected while the radar transceiver 106 is positioned within the height segment associated with the target reflector. The radar-based distance measurement may be determined in real-time as frequency spectrum data is collected in real-time. Due at least in part on the determination and association of height segments to radar reflectors 110 as well as the positioning of the radar reflectors 110 (e.g., based at least in part on the signal range of the radar transceiver), the frequency spectrum data may include a limited number of frequency peaks that correspond to radar reflectors 110, including the target reflector. For example, the frequency spectrum data may include one significant frequency peak corresponding to the target reflector. The frequency spectrum data may include other frequency peaks corresponding to other reflectors, although the other frequency peaks may have a lesser or insignificant magnitude based at least in part on reduced signal strength of radar signals reflected from the other reflectors.

By identifying the frequency peak corresponding to the target reflector within the frequency spectrum data, the controller 150 may determine a radar-based distance measurement from the radar transceiver 106 to the target reflector, which may then represent a distance between the elevator car 105 and the target reflector with the radar transceiver 106 being fixedly attached to the elevator car 105, in various embodiments. Specifically, the frequency of the frequency peak within the frequency spectrum data is related to the distance between the radar transceiver 106 and the target reflector, and the controller 150 is configured to calculate a radar-based distance measurement from the frequency peak.

At block 508, the controller 150 is configured to determine an inferred position of the elevator car 105 based at least in part on the radar-based distance measurement to the target reflector and the empirical height for the target reflector. In various embodiments, the controller 150 comprises means, such as processor 305, memory 310, communications circuitry 315, and/or the like, for determining an inferred position of the elevator car 105 based at least in part on the radar-based distance measurement to the target reflector and the empirical height of the target reflector. For example, the controller 150 may retrieve an empirical height for the target reflector from memory 310 and/or from a database via communications circuitry 315 using the reflector index or identifier associated with the target reflector. In various embodiments, the empirical height of the target reflector is previously determined and stored (e.g., in memory 310, in a database) in accordance with example operations of flowchart 400.

With the empirical height of the target reflector being a relative position of the target reflector within the elevator shaft 101, a relative position of the elevator car 105 within the elevator shaft 101 can also be inferred. For example, with positions within the elevator shaft 101 being in reference to the bottom shaft surface, a relative position of the elevator car 105 can be inferred based at least in part on the target reflector being at 100 meters (e.g., above the bottom shaft surface) and the elevator car 105, or specifically the radar transceiver 106 fixedly attached to the elevator car 105, being 15 meters away from and below the target reflector, in an exemplary illustrative scenario. Therefore, a position of the elevator car 105 may be determined based at least in part on a position of the target reflector and a distance of the elevator car 105 from the target reflector.

In various embodiments, at least some of the example operations described by flowchart 500 for determining a position of the elevator car 105 within the elevator shaft 101 may be performed continuously and repeatedly during normal operation of the elevator car 105, such as during transport of people and/or cargo between different elevations and levels within the elevator shaft. In some example embodiments, determination of elevator car position (e.g., via performing at least blocks 504, 506, and 508) is performed iteratively and periodically according to a configurable frequency. In some additional example embodiments, an iteration of determination of elevator car position (e.g., via performing at least blocks 504, 506, and 508) is triggered and performed whenever the elevator car is positioned within a configurable proximity distance to a radar reflector 110 (e.g., determined based at least in part on the empirical or reference positions of the radar reflectors 110). In each subsequent iteration, the inferred position determined at block 508 may become the initial position for selection of a target reflector at block 504.

As described herein then, various embodiments are directed to determining a position of an elevator car 105 within an elevator shaft 101 using radar-based distance measurements to a target reflector selected from a plurality of radar reflectors positioned along the elevator shaft 101. Various embodiments as described herein provide technical effects and technical advantages in improving the accuracy and efficiency of elevator car positioning. Selection of a target reflector that is optimally positioned with respect to the elevator car 105 reduces inaccuracy and noise that may arise from radar-based distance measurements using reflectors that are too far away and reflectors that are too close. Analysis of frequency spectrum data to determine such radar-based distance measurement may be efficient due to the identification of one frequency peak corresponding to the selected target reflector. Generally, technical challenges that may arise from signal attenuation, high incidence angles, and multi-path interference are overcome through various embodiments of the present disclosure, and elevator positioning systems and methods of use thereof in accordance with some example embodiments may determine elevator car positions with an error of less than approximately 5 millimeters.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for determining a position of an elevator car within an elevator shaft by an elevator positioning system, the elevator positioning system comprising a plurality of radar reflectors, a radar transceiver, and a controller communicably connected to the radar transceiver and configured to perform the method, the method comprising:

associating a height segment of the elevator shaft with each of the plurality of radar reflectors positioned along the elevator shaft;

selecting a target reflector from the plurality of radar reflectors based at least in part on an initial height of the elevator car being within a height segment associated with the target reflector; and determining an inferred position of the elevator car within the elevator shaft based at least in part on determining a radar-based distance measurement to the target reflector.

2. The method of claim 1, wherein the plurality of radar reflectors are positioned such that at least one of the plurality of radar reflectors is optimally detectable by a dynamically-positioned radar transceiver of the elevator car.

3. The method of claim 1, wherein each of the plurality of radar reflectors is associated with an empirical height measurement, and wherein the inferred position of the elevator car is determined based at least in part on the radar-based distance measurement to the target reflector and an empirical height measurement associated with the target reflector.

4. The method of claim 3, wherein the empirical height measurements for the plurality of radar reflectors are determined based at least in part on:

obtaining frequency spectrum data at a plurality of positions within the elevator shaft;

identifying frequency peaks that correspond to the plurality of radar reflectors across the frequency spectrum data for the plurality of positions; and calculating the empirical height measurement for a particular radar reflector based at least in part on frequency values of a frequency peak corresponding to the particular radar reflector across the frequency spectrum data at the plurality of positions.

5. The method of claim 1, wherein the radar-based distance measurement to the target reflector is determined based at least in part on identifying a frequency peak corresponding to the target reflector within frequency spectrum data.

6. The method of claim 1, wherein at least one of the plurality of radar reflectors is a pyramidal frustum reflector configured to directly reflect radar signals originating from the dynamically-positioned radar transceiver back to the dynamically-positioned radar transceiver.

7. The method of claim 1, wherein at least one radar reflector of the plurality of radar reflectors is configured with a particular geometric shape or arrangement such that radar signals reflected by the at least one radar reflector comprise a unique signature.

8. The method of claim 7, wherein the unique signature is caused based at least in part on the at least one radar reflector being one of (i) two or more reflecting objects positioned in a particular geometric arrangement, or (ii) a pyramidal frustum reflector configured with a base plane of a particular geometric shape.

9. An elevator positioning system for determining a position of an elevator car within an elevator shaft, the elevator positioning system comprising:

a plurality of radar reflectors positioned along the elevator shaft;

a radar transceiver configured to generate real-time frequency spectrum data;

a controller communicably connected to the radar transceiver, the controller configured to:

associate a height segment of the elevator shaft with each of the plurality of radar reflectors;

select a target reflector from the plurality of radar reflectors based at least in part on an initial height of the elevator car being within a height segment associated with the target reflector;

determine an inferred position of the elevator car within the elevator shaft based at least in part on a determining a radar-based distance measurement to the target reflector.

10. A computer program product for determining a position of an elevator car within an elevator shaft by an elevator positioning system, the elevator positioning system comprising a plurality of radar reflectors, a radar transceiver, and a controller communicably connected to the radar transceiver, the computer program product comprising at least one non-transitory computer-readable storage medium having computer-executable program code portions stored therein, the computer-executable program code portions comprising program code instructions configured to cause the controller to:

associate a height segment of the elevator shaft with each of the plurality of radar reflectors positioned along the elevator shaft;

select a target reflector from the plurality of radar reflectors based at least in part on an initial height of the elevator car being within a height segment associated with the target reflector; and determine an inferred position of the elevator car within the elevator shaft based at least in part on determining a radar-based distance measurement to the target reflector.

* * * * *